United States Patent
Karmi et al.

(10) Patent No.: US 7,616,930 B2
(45) Date of Patent: Nov. 10, 2009

(54) DETERMINING A PHASE ADJUSTMENT IN ACCORDANCE WITH POWER TRENDS

(75) Inventors: Yair Karmi, Manalapan, NJ (US); Haim Harel, New York, NY (US); Kenneth A. Kludt, San Jose, CA (US)

(73) Assignee: Magnolia Broadband Inc., Bedminster, NJ (US)

( * ) Notice: Subject to any disclaimer, the term of this patent is extended or adjusted under 35 U.S.C. 154(b) by 691 days.

(21) Appl. No.: 11/136,020

(22) Filed: May 24, 2005

(65) Prior Publication Data

US 2006/0270359 A1 Nov. 30, 2006

(51) Int. Cl.
*H04B 1/00* (2006.01)
*H04B 7/00* (2006.01)
*H04B 17/02* (2006.01)

(52) U.S. Cl. .......................... 455/69; 455/522; 455/139

(58) Field of Classification Search .................. 455/69, 455/67.16, 139, 276.1, 304, 13.4, 522, 574, 455/127.1, 127.5
See application file for complete search history.

(56) References Cited

U.S. PATENT DOCUMENTS

| | | | |
|---|---|---|---|
| 5,642,353 A | 6/1997 | Roy, III et al. |
| 5,832,044 A | 11/1998 | Sousa et al. |
| 5,991,330 A | 11/1999 | Dahlman et al. |
| 5,999,826 A | 12/1999 | Whinnett |
| 6,185,440 B1 | 2/2001 | Barratt et al. |
| 6,226,509 B1 | 5/2001 | Mole et al. |
| 6,236,363 B1 | 5/2001 | Robbins et al. |
| 6,330,294 B1 | 12/2001 | Ansbro et al. |
| 6,343,218 B1 | 1/2002 | Kaneda et al. |
| 6,392,988 B1 | 5/2002 | Allpress et al. |
| 6,492,942 B1 | 12/2002 | Kezys |
| 6,636,495 B1 | 10/2003 | Tangemann |
| 6,704,370 B1 | 3/2004 | Chheda et al. |
| 6,745,009 B2 | 6/2004 | Raghothaman |

(Continued)

FOREIGN PATENT DOCUMENTS

EP 0 986 193 3/2000

(Continued)

OTHER PUBLICATIONS

Patent Application entitled, "*Modifying A Signal By Adjusting The Phase And Amplitude Of The Signal*", 38 pages specification, claims and abstract, 3 pages of drawings, inventors Yair (nmi) Karmi, et al., May 24, 2005.

(Continued)

*Primary Examiner*—Eugene Yun
(74) *Attorney, Agent, or Firm*—Pearl Cohen Zedek Latzer, LLP

(57) ABSTRACT

Calculating a phase adjustment includes establishing a current phase adjustment for a signal transmitted from a modifying communication device to a feedback communication device. A control signal is received. The control signal comprises windows communicating power indicators that reflect the power of the signal. A previous window communicates power indicators reflecting the power of the signal, and a current window communicates current power indicators reflecting the power of the signal. A previous power trend is estimated from previous power indicators, and a current power trend is estimated from current power indicators. A power trend change is determined from the previous power trend and the current power trend, and a phase increment is determined in accordance with the power trend change. A next phase adjustment is calculated from the current phase adjustment and the phase increment.

45 Claims, 3 Drawing Sheets

U.S. PATENT DOCUMENTS

| | | | |
|---|---|---|---|
| 6,810,264 B1 | 10/2004 | Park et al. |
| 6,859,643 B1 | 2/2005 | Ma et al. |
| 6,865,377 B1 | 3/2005 | Lindskog et al. |
| 6,882,228 B2 | 4/2005 | Rofougaran |
| 7,010,318 B2 | 3/2006 | Chang et al. |
| 7,054,639 B2 | 5/2006 | Lin et al. |
| 2002/0128026 A1 | 9/2002 | Derryberry et al. |
| 2003/0002594 A1 | 1/2003 | Harel et al. |
| 2003/0112880 A1 | 6/2003 | Walton et al. |
| 2004/0048584 A1 | 3/2004 | Vaidyanathan et al. |
| 2004/0085239 A1 | 5/2004 | Ukena et al. |
| 2005/0059355 A1 | 3/2005 | Liu |
| 2005/0143113 A1 | 6/2005 | Lee et al. |
| 2006/0084388 A1 | 4/2006 | Li et al. |
| 2006/0267983 A1 | 11/2006 | Karmi et al. |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 02/099999 A1 | 12/2002 |
| WO | WO 03/090386 | 10/2003 |
| WO | WO 2004/045108 | 5/2004 |
| WO | WO 2005/081444 | 9/2005 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

PCT, International Search Report and Written Opinion (ISA/EP) for PCT/US2006/019228, 10 pages, Sep. 27, 2006.

PCT, International Search Report and Written Opinion (ISA/EP) for PCT/US2006/018734, 10 pages, Sep. 27, 2006.

U.S. Appl. No. filed, Jun. 23, 2005, Harel et al.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

DETERMINING A PHASE ADJUSTMENT IN ACCORDANCE WITH POWER TRENDS

TECHNICAL FIELD

This invention relates generally to the field of wireless communications and more specifically to determining a phase adjustment in accordance with power trends.

BACKGROUND

A transmitting communication device may have multiple antenna elements that transmit signals to communicate information. A receiving communication device extracts the information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for determining phase adjustments may be reduced or eliminated.

According to one embodiment of the present invention, calculating a phase adjustment includes establishing a current phase adjustment for a signal transmitted from a modifying communication device to a feedback communication device. A control signal is received. The control signal comprises windows communicating power indicators that reflect the power of the signal. A previous window communicates power indicators reflecting the power of the signal, and a current window communicates current power indicators reflecting the power of the signal. A previous power trend is estimated from previous power indicators, and a current power trend is estimated from current power indicators. A power trend change is determined from the previous power trend and the current power trend, and a phase increment is determined in accordance with the power trend change. A next phase adjustment is calculated from the current phase adjustment and the phase increment.

Certain embodiments of the invention may provide one or more technical advantages. A technical advantage of one embodiment may be that a signal may be modified to optimize signal power. The signal may be modified in accordance with phase adjustments calculated from power trend changes. Power trend changes may yield more accurate estimates of the phase adjustments that optimize signal power. A technical advantage of another embodiment may be that power trend changes may be determined from a control signal that is divided into windows. Each window may include participating slots that provide information about the power trend of a window. The power trend of a preceding window may be compared to the power trend of a current window in order to determine a power trend change.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
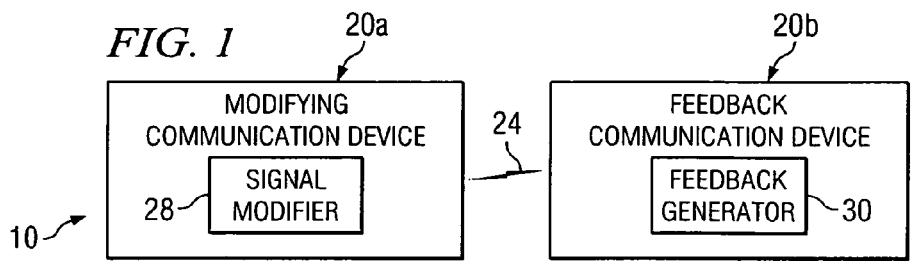
FIG. 1 is a block diagram illustrating one embodiment of a communication network that includes a modifying communication device that determines phase adjustments in accordance with power trends.

FIG. 1 is a block diagram illustrating one embodiment of a communication network 10 that includes a modifying communication device that determines phase adjustments in accordance with power trends. Communication network 10 includes one or more modifying communication devices 20a and one or more feedback communication devices 20b that communicate via a wireless link 24. According to the embodiment, a modifying communication device 20a applies a phase adjustment to a signal transmitted to feedback communication device 20b. Feedback communication device 20b returns feedback that describes the power of the signal. Modifying communication device 20a obtains information about the feedback from a control signal that is divided into windows. The power trends of windows may be calculated from the information to determine a next phase adjustment.

According to the illustrated embodiment, network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding. For example, network 10 may comprise a Global System for Mobile communications (GSM) network.

Network 10 communicates information using packets. A packet may comprise a bundle of data organized in a specific way for transmission, and a frame may comprise the payload of one or more packets organized in a specific way for transmission. A packet may carry any suitable information, such as voice, data, multimedia, other information, or any combination of the preceding. A packet may comprise any suitable packet, such as a General Packet Radio Service (GPRS) packet, an Enhanced Data for GSM Evolutions (EDGE) packet, or other suitable packet.

A communication device 20 comprises any device operable to communicate information via signals to one or more other communication devices 20. For example, communication device 20 may comprise a subscriber unit or a base station. A subscriber unit may comprise any device operable to communicate with a base station, for example, a personal digital assistant, a cellular telephone, a mobile handset, or any other device suitable for communicating data to and from a base station. A subscriber unit may support, for example, Session Initiation Protocol (IP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units, and may have one or more antennas. The base station controller manages the operation of the base transceiver station.

A communication device 20 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

Communication devices 20 may communicate with one or more subscriber units, one or more base stations, one or more other communication devices, or any combination of the preceding. Communication devices 20 may communicate according to any suitable communication protocol. For example, communication devices 20 may communicate according to any suitable code division multiple access (CDMA) protocol. Examples of other protocols include any generation Universal Mobile Telecommunications System (UMTS), hybrid multiple access protocols, 802.xx protocols, time division multiple access (TDMA) protocols, and frequency division multiple access (FDMA) protocols.

A communication link between communication devices 20a and 20b such as wireless link 24 may be a radio frequency link that is cellular in network organization. Wireless link 24 may be used to communicate a signal between communication devices 20a and 20b. Wireless link 24 may be configured according to a Multiple-Input-Multiple-Output (MIMO) communication protocol.

Modifying communication device 20a includes a signal modifier 28 that modifies one or more signals in accordance with feedback received from feedback communication device 20b. A signal may be modified by applying a phase adjustment to the signal. The signals may be modified to increase constructive interference or reduce destructive interference.

According to one embodiment, signal modifier 28 obtains feedback information from a control signal generated by a baseband subsystem of modifying communication device 20a. A control signal may refer to a signal that provides instructions to a component of a communication device. According to the embodiment, the baseband subsystem determines the feedback from feedback communication device 20b. The feedback may indicate, for example, whether modifying communication device 20a should increase or reduce transmission power. The baseband subsystem generates a control signal that reflects the feedback information. For example, the control signal may provide instructions on whether to increase or reduce transmission power.

According to another embodiment, signal modifier 28 obtains feedback information from a quality indication signal from feedback communication device 20b. A quality indication signal may comprise a signal having information about the quality of the communication link, for example, a power control signal of any suitable CDMA protocol, an error rate message, other suitable quality indication signal, or any combination of the preceding. A quality indication signal may be transmitted at any suitable rate, for example, once every 1.25 ms for cdmaOne (IS-95)/CDMA2000 or once every 0.66 ms for WCDMA.

According to the embodiment, a power control signal may include one or more power control bits. A power control bit indicates either an up value or a down value for a given time period. An up value represents an indication that modifying communication device 20a should increase the total power of its transmitted signal, and may correspond to a control signal indicating a low transmission power. A down value represents an indication that modifying communication device 20a should decrease the total power of its transmitted signal, and may correspond to a control signal indicating a high transmission power. Signal modifier 28 may directly use power control bits or may used information derived from the power control bits.

Signal modifier 28 may use information from current and previous windows to determine a phase adjustment for a next window. According to one embodiment, a next phase adjustment $\Phi(k+1)$ of window k+1 may be calculated from current phase adjustment $\Phi(k)$ of window k and phase increment $\Delta\Phi(k)$ according to Equation (1):

$$\Phi(k+1)=\Phi(k)+\Delta\Phi(k) \tag{1}$$

Feedback communication device 20b includes a feedback generator 30 that generates one or more quality indicators that reflect the quality of wireless link 24 in response to the modified signals. Communication device 20b sends the quality indicators to modifying communication device 20a, which uses the quality indicators to determine the next modification. According to one embodiment, a quality indicator may inform modifying communication device 20a to increase or decrease transmission power, and may comprise, for example, a power control bit.

If the one or more feedback communication devices 20b comprise a single base station, transmit diversity may be used to increase coverage and reduce power usage by modifying communication device 20a. If the one or more feedback communication devices 20b comprise multiple base stations, transmit diversity may be used to increase capacity as well as increase coverage and reduce power usage by modifying communication device 20a. Common logic for the multiple base stations may determine the feedback. For example, common logic may instruct modifying communication device 20a to reduce transmit power in response to a request from at least one of the base stations. Alternatively, a servicing base station of the multiple base stations may determine the feedback.

Certain embodiments of network 10 may provide advantages. A technical advantage of one embodiment may be that network 10 may improve directivity towards a feedback communication device 20b, which may reduce total transmitted power by modifying communication device 20a. Moreover, the improved directivity may reduce the variability of path loss, so the transmit power required to account for fast fading effects may be reduced. Another technical advantage of one embodiment may be that reduction of the total transmit power may reduce interference with neighboring base stations.

Modifications, additions, or omissions may be made to communication network 10 without departing from the scope of the invention. Additionally, operations of communication network 10 may be performed using any suitable logic comprising software, hardware, other logic, or any suitable combination of the preceding. As used in this document, "each" refers to each member of a set or each member of a subset of a set. A subset of a set may include none, some, or all elements of the set.

Figure 2:
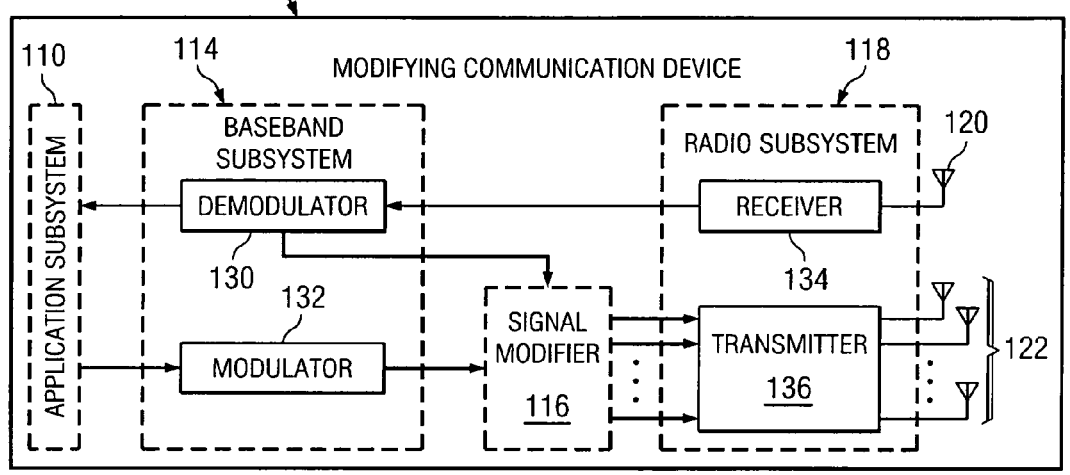
FIG. 2 is a block diagram illustrating one embodiment of a modifying communication device that may be used with the network of FIG. 1.

FIG. 2 is a block diagram illustrating one embodiment of a modifying communication device 20a that may be used with network 10 of FIG. 1. Modifying communication device 20a may comprise, for example, a subscriber unit. Modifying communication device 20a may include an application subsystem 110, a baseband subsystem 114, a signal modifier 116, a radio subsystem 118, a receive antenna 120, and one or more transmit antennas 122 coupled as shown. Baseband subsystem 114 includes a demodulator 130 and a modulator 132, and radio subsystem 118 includes a receiver 132 and a transmitter 136. According to one embodiment of operation, a receive signal passes through receive antenna 120, receiver 134, demodulator 130, and application subsystem 110. A transmit signal passes through application subsystem 110, modulator 132, signal modifier 116, transmitter 136, and transmit antennas 122.

Application subsystem 110 processes receive signals to extract information communicated in the receive signals, and processes transmit signals for transmission to communicate information. Baseband subsystem 114 performs baseband signal processing. Modulator 130 modulates signals, and demodulator 132 demodulates signals and extracts quality indicators from signals.

According to one embodiment, baseband subsystem 114 generates a control signal that controls the transmission power of modifying communication device 20a. Any other suitable component of modifying communication device 20a, however, may generate the control signal. A control signal may instruct modifying communication device 20a to increase or decrease the transmission power in accordance with feedback from feedback communication device 20b.

Signal modifier 116 modulates one or more of signals to yield one or more modified signals, each of which may be transmitted by an element of transmit antennas 122. The signals may be modified to increase constructive interference or reduce destructive interference. Signal modifier 116 may include control logic that controls the operation of signal modifier 116, and memory that stores data used by the control logic.

A modification may refer to one or more adjustments of one or more modulation features of a signal. A modulation feature refers to a feature of a signal that may be modulated, for example, a phase, amplitude, frequency, timing, other suitable modulation feature, or any combination of the preceding. According to one embodiment, a modification may be described as the application of a diversity parameter, where a diversity parameter represents a modulation feature. According to the embodiment, adjusting a modulation feature may be described as applying a diversity parameter representing the modulation feature. As an example, diversity parameters Φ and A may represent phase and amplitude, respectively.

Signal modifier 116 may modify signals to adjust the power balance between transmitted signals in order to improve the effectiveness of transmit diversity. Phase adjustment typically has a greater effect on the efficiency of transmit diversity than amplitude adjustment, but amplitude adjustment may improve transmit diversity gain and transmit power efficiency. According to one embodiment, the phase and amplitude may be adjusted during alternate duty cycles. According to the embodiment, the duty cycle may be selected such that the phase is adjusted more than the amplitude is adjusted. The duty cycle may be constant or varied.

According to one embodiment, signal modifier 116 may adjust the amplitude by maintaining a constant total power and changing the relative power between antennas 122. The relative power between antennas 122 may be changed by increasing the difference between power levels fed into antenna ports of antennas 122. For example, if $P_A$ represents the power for antenna A, and $P_b$ represents the power for antenna B, then $P_A[dB]-P_B[dB]$ may be increased to change the relative power between antennas A and B. The difference may be increased in one dB steps.

The relative power between antennas 122 may be calculated from the linear representation of power. The total power P[Watt] may be related to relative powers $P_A[dB]-P_B[dB]$ according to Equation (2):

$$P_A = K_A * P \text{ and } P_B = K_B * P \qquad (2)$$

where $P_B + P_A = P$ and $K_B + K_A = 1$. The ratio $r = P_B/P_A = K_B/K_A$ that maintains total power P may be given by Equation (3):

$$K_A = 1/(1+r); K_B = r/(1+r) \qquad (3)$$

Since $P_B[dB] + 10*\log_{10}(r) = P_A[dB]$, then $k[dB] = 10*\log_{10}(r)$ or $r = 10^{k/10}$. TABLE 1 describes the correspondence for example values.

TABLE 1

| k | r | $K_A$ | $K_B$ |
|---|---|---|---|
| −5 | 0.316 | 0.760 | 0.240 |
| −4 | 0.398 | 0.715 | 0.285 |
| −3 | 0.501 | 0.666 | 0.334 |
| −2 | 0.631 | 0.613 | 0.387 |
| −1 | 0.794 | 0.557 | 0.443 |
| 0 | 1.000 | 0.500 | 0.500 |
| 1 | 1.259 | 0.443 | 0.557 |
| 2 | 1.585 | 0.387 | 0.613 |
| 3 | 1.995 | 0.334 | 0.666 |
| 4 | 2.512 | 0.285 | 0.715 |
| 5 | 3.162 | 0.240 | 0.760 |

According to one embodiment, measurements from a base station may be used to control the relative power. According to the embodiment, each transmit path is separately activated for a short duration in an alternating fashion. The total power may be either equal to a previous total transmit power or increased by the estimated diversity gain to maintain the power received by the base station. According to one embodiment, feedback from the base station indicates the relative strength of each transmit path separately. According to another embodiment, the feedback indicates the differences in the relative strengths. The process may be repeated to achieve the sufficient accuracy.

Radio subsystem 118 performs radio frequency signal processing. Receiver 134 receives signals from receive antenna 120, and transmitter 136 sends signals to one or more transmit antennas 122. Radio subsystem 118 may include a duplexer/diplexer that separates different bands such as cellular service from Personal Communication Service (PCS) bands, receive from transmit bands, or both. Receive antenna 120 receives signals and may have one or more antenna elements. Transmit antennas 122 transmit signals and may have one or more antenna elements, where each antenna element transmits a transmit signal.

Modifications, additions, or omissions may be made to modifying communication device 20a without departing from the scope of the invention. For example, communication device 20a may have more, fewer, or other modules. Moreover, the operations of communication device 20a may be performed by more, fewer, or other modules. Additionally, operations of communication device 20a may be performed using any suitable logic comprising software, hardware, other logic, or any suitable combination of the preceding.

Figure 3:
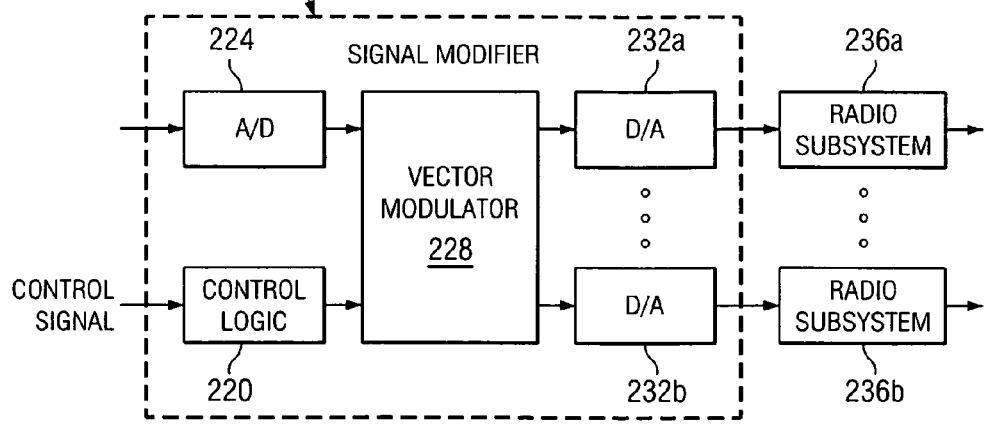
FIG. 3 is a block diagram illustrating one embodiment of a signal modifier that may be used with the modifying communication device FIG. 2.

FIG. 3 is a block diagram illustrating one embodiment of a signal modifier 116 that may be used with any suitable communication device 20 such as communication device 20a-c of FIG. 2. Signal modifier 116 includes control logic 220, an analog-to-digital (A/D) converter 224, a vector modulator 228, and one or more digital-to-analog (D/A) converters 228a and 228b coupled as shown. D/A converters 228a and 228b are coupled to one or more radio subsystems 236a and 236b as shown. A D/A converter 228a and a radio subsystem 236a may be associated with an antenna element.

According to the illustrated embodiment, signal modifier 116 receives a signal. A/D converter 224 converts the signal from an analog form to a digital form and forwards the signal to vector modulator 228. Control logic 220 receives a control signal and establishes a phase adjustment in accordance with the control signal. Control logic 220 provides to vector modulator 228 instructions for performing the modification according to the phase adjustment.

According to one embodiment, control logic 220 provides complex weighting values to vector modulator 228. The complex weighting may be calculated by determining the appropriate weighting value associated with the in-phase signal component and the quadrature signal component for an antenna element. As an example, if the phase is being adjusted, the weighting value for the in-phase signal component may be different from the weighting value for the quadrature signal component. The complex weighting may be based on features such as the total power of the transmitted signal, the phase rotation associated with each antenna element, the power ratio associated with each antenna element, the time delay associated with each antenna element, other feature, or any combination of the preceding.

Vector modulator 228 splits the signal into multiple signals, and 228 applies the complex weighting to at least a subset of the signals to modify the subset of signals based on the complex weighting values. D/A converters 228a through 228b convert the signals to analog form. Radio subsystems 236a through 236b convert the signals to a radio frequency. The signals may be forwarded to power amplifiers and respective antenna elements.

Modifications, additions, or omissions may be made to signal modifier 116 without departing from the scope of the invention. For example, signal modifier 116 may have more, fewer, or other modules. Moreover, the operations of signal modifier 116 may be performed by more, fewer, or other modules. Additionally, operations of signal modifier 116 may be performed using any suitable logic comprising software, hardware, other logic, or any suitable combination of the preceding.

Figure 4:
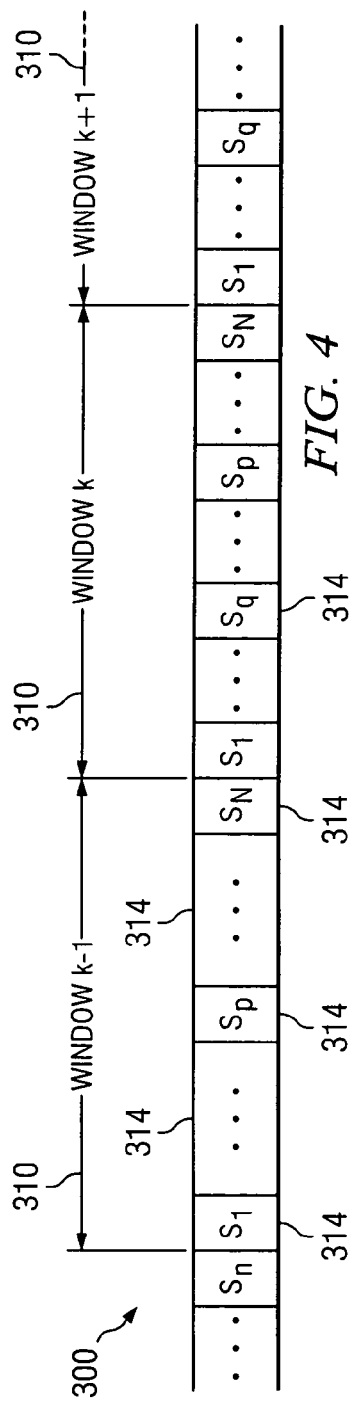
FIG. 4 is a diagram illustrating an example control signal that my be used to determine power trends.

FIG. 4 is a diagram illustrating of an example control signal 300 that may be used to determine power trends. Control signal 300 is divided into windows 310. A window may refer to a portion of a signal, where the portion has a predetermined length. According to the illustrated embodiment, control signal 300 has windows k−1, k, and k+1. A window 310 may be divided into one or more slots 314. A slot may refer to portion of a window. Slots 314 may have the same duration, or may have different durations. According to the illustrated embodiment, a window 310 has slots $S_1, \ldots S_N$, where N represents the number of slots 314 of a window 310. The number N may be configurable, and may have any suitable value, for example, a value between 3 and 33. For example, the number N may have a value from four to ten. As an example, N=8 may be used for Evolution Data Only (EvDO) technology, and N=6 may be used for 1× technology. As another example, N=8 may be used for both EvDO technology and 1× technology. According to one embodiment, a next window k+1 starts immediately after a current window k, with no overlapping or skipped slots 314. According to another embodiment, a next window k+1 may overlap a current window k.

Diversity parameters may be applied at the beginning of each window 310. For example, diversity parameters $D_{k-1}$ ($A_{k-1}, \Phi_{k-1}$) may be applied at the beginning of window k−1, diversity parameters $D_k(A_k, \Phi_k)$ may be applied at the beginning of window k, and diversity parameters $D_{k+1}(A_{k+1}, \Phi_{k+1})$ may be applied at the beginning of window k+1.

Slots 314 may include participating slots $S_p, \ldots, S_q$, where $S_p$ refers to an initial participating slot and $S_q$ refers to a final participating slot. A participating slot may refer to a slot 314 that carries a power indicator, which may be measured to determine a power value of slot 314. A power indicator may refer to an indicator that reflects the power of the transmitted signal as received by feedback communication device 20b. A slot power value may be estimated from a power indicator.

A characterizing sample may be used to determine the power value for a slot. If multiple samples per slot are available, a value from a specific characterizing sample may be used. Alternatively, a statistical approach may be used to determine a value. For example, the average, median, maximum, minimum, or other value may be determined from the samples.

Typically, there is a delay between when modifying communication device 20a modifies a signal and when the control signal reflects the feedback from feedback communication device 20b. For example, modifying communication device 20a modifies a signal and transmits the signal to feedback communication device 20b. Feedback communication device sends feedback after a delay of, for example, r slots 314. According to one embodiment, the control signal may substantially immediately reflect the feedback. Accordingly, the next immediate slot, for example, slot $S_{r+1}$ may be considered initial participating slot $S_p$. According to another embodiment, the control signal may reflect the power indicator in a later slot $S_t, t>r+1$, which would be considered the initial participating slot $S_p$. The final participating slot $S_q$ may be located in the next window 310, or other suitable slot 314.

According to one embodiment, the control signal may comprise a TxAGC signal that comprises pulse-density modulation (PDM) sequences. A PDM sequence may comprise any suitable number of bits, such as 1,025 bits. A PDM sequence may be used as a power indicator. A slot power value may be calculated from a PDM sequence in any suitable manner. According to the embodiment, a power value $T_x$ may be determined from a PDM sequence from a look-up table or according to Equation (4):

$$T_x = \frac{PDM - \alpha}{\beta} \tag{4}$$

where PDM represents a PDM value, and $\alpha$ and $\beta$ represent constants of the relationship between $T_x$ and PDM if the relationship is linear. The PDM value may be defined in any suitable manner, such as the number of ones of a PDM sequence. If α=750, and β=10, and Equation (2) may be used to map PDM values in the range from 200 to 990 to transmit power values in the range of −55 to +24.

A window 310 may have a window power value representing the power of a window 310. A power of a window may refer to the average of the power values of the participating slots of the window. According to one embodiment, if the number N of slots 314 of a window 310 is constant, the power values of the participating slots may be added to represent the average power of the window. A window 310 may have a power trend. A power trend may refer to the slope of the power inside the window 310. According to one embodiment, slope may be measured as the difference in power values of the last participating slot $S_q$ and the first participating slot $S_p$.

Modifications, additions, or omissions may be made to control signal 300 without departing from the scope of the invention. For example, control signal 300 may include more, fewer, or other windows 310 or slots 314.

Figure 5:
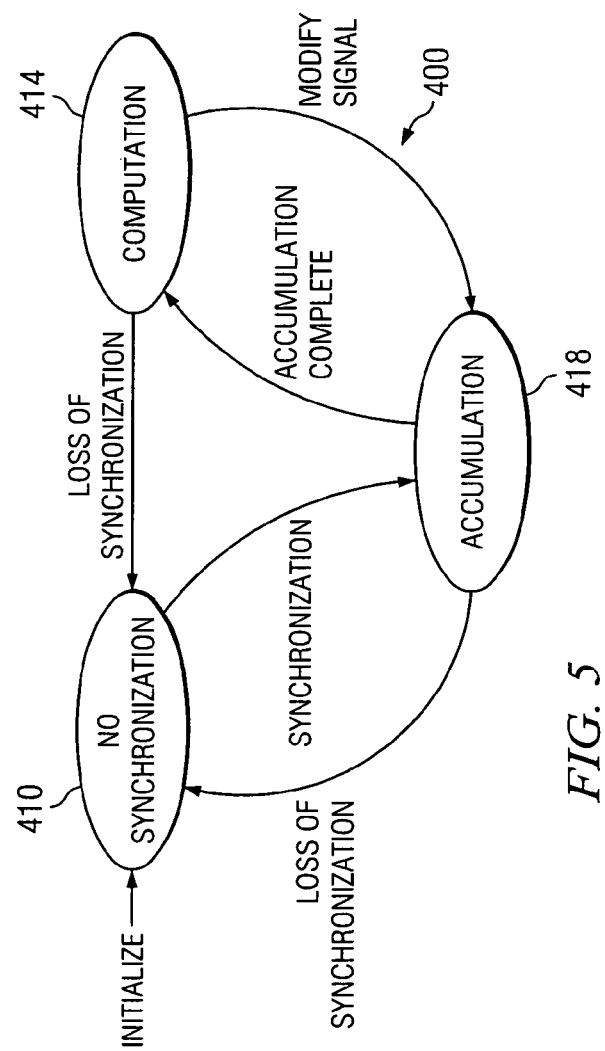
FIG. 5 is a diagram illustrating an example state diagram that may be used to determine a phase adjustment from power trends.

FIG. 5 is a diagram illustrating an example state diagram 400 that may be used to determine phase adjustments from power trends. State diagram 40 includes states 410, 414, and 418. According to the illustrated embodiment, the states include a no synchronization state 410, a phase computation state 414, and an accumulation state 418. No synchronization state 410 represents the state where there is no synchronization. Accumulation state 414 represents the state of accumulating power indicators. Accumulation state 414 may be activated by an internal clock. The internal clock may indicate when the power indicators should be read and stored and when the power values, power trends, or both should be calculated. Phase computation state 414 represents the state during which the next phase adjustment is calculated and used to modify the signal.

According to one embodiment of operation, state diagram 400 is initialized at no synchronization state 410. When synchronization is achieved, the samples may be associated with power control groups. State diagram 400 moves to accumulation state 418, where power indicators are accumulated in each window. After accumulation is complete, state diagram 400 moves to phase computation state 414, where a next phase is computed. After the next phase is computed, state diagram 400 returns to accumulation state 418 to accumulate more power indicators. If there is a loss of synchronization at either phase computation state 414 or accumulation state 418, state diagram 400 returns to no synchronization state 410.

Modifications, additions, or omissions may be made to state diagram 400 without departing from the scope of the invention. For example, state diagram 400 may have more, fewer, or other states coupled by more, fewer, or other actions. Moreover, the operations of state diagram 400 may be performed by more, fewer, overlapping, or other states. For example, phase computation state 414 may be activated when data is available, while accumulation state 418 continues. Additionally, operations of state diagram 400 may be performed using any suitable component of communication device 20a.

Figure 6:
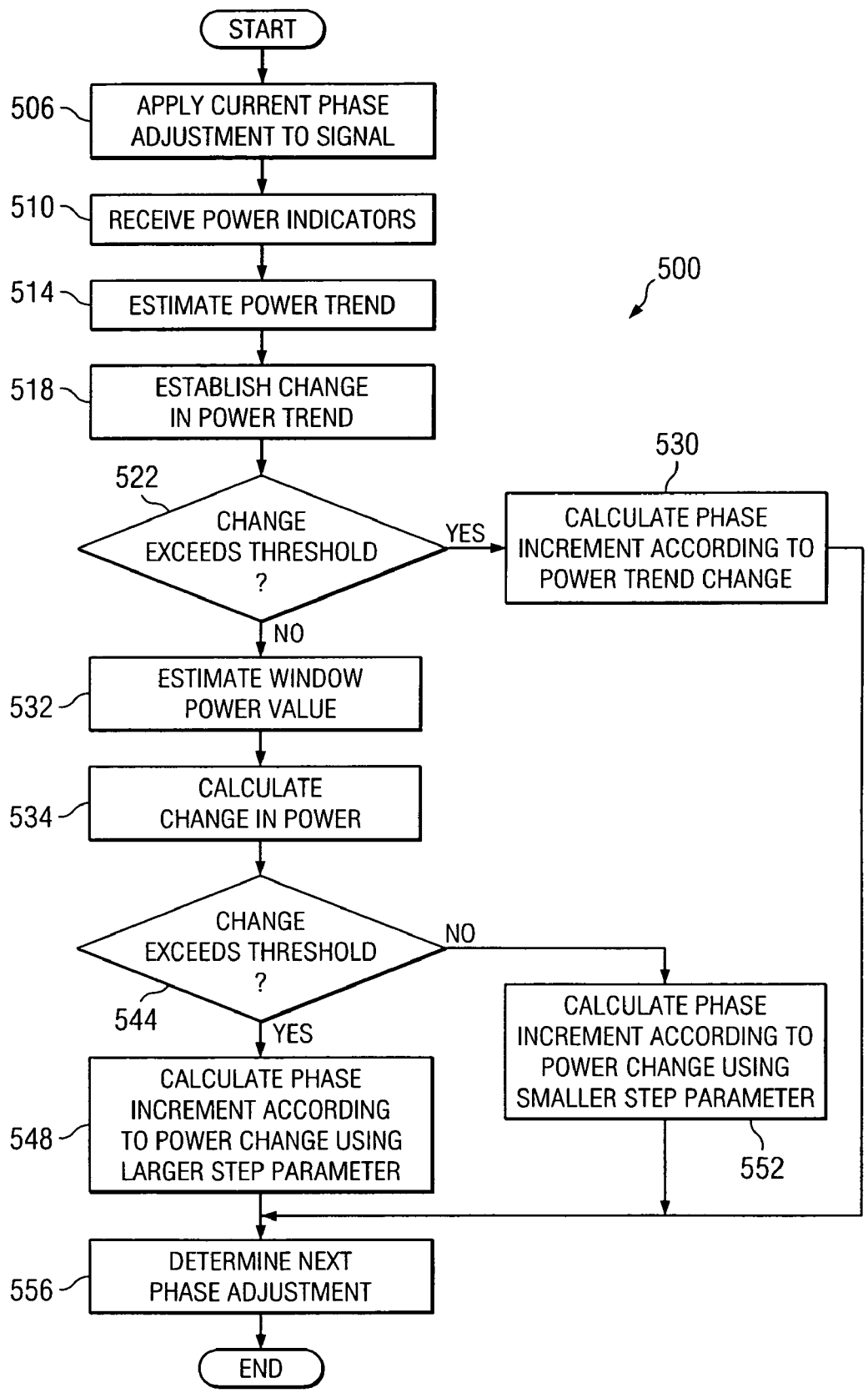
FIG. 6 is a flowchart illustrating one embodiment of a method for determining phase adjustments from power trends that may be used by the signal modifier of FIG. 3.

FIG. 6 is a flowchart 500 illustrating one embodiment of a method for determining phase adjustments from power trends that may be used by signal modifier of 116 of FIG. 3. The method begins at step 506, where a current phase adjustment is applied to a signal to yield a modified signal. Power indicators indicating feedback in response to the modified signal are received at step 510. Power indicators may be received by control logic 220 of signal modifier 116.

The power trend is estimated from the power indicators at step 514. A power trend of a window may refer to the slope of power within the window. According to one embodiment, the power trend may be calculated by taking the difference between the power value of an initial participating slot and the power value of a final participating slot as expressed by Equation (5):

$$\text{trend}(k)=PS(i_{fin},k)-PS(i_{init},k) \quad (5)$$

where PS(i,k) denotes the power value of slot i of window k, $i_{init}$ represents the initial participating slot, and $i_{fin}$ represents the final participating slot. For example, power trend trend(k) for window k may calculated according to Equation (6):

$$\text{trend}(k)=PDM(i_{fin},k)-PDM(i_{init},k) \quad (6)$$

where PDM(i,k) denotes the PDM value of slot i of window k, $i_{init}$ represents the initial participating slot, and $i_{fin}$ represents the final participating slot.

Power value PS(i,k) may represent a linear value or a logarithmic value. If the samples are logarithmic, the difference in power represents the ratio between final and initial power as expressed by Equation (7):

$$P(i_{fin},k)[db] - P(i_{init},k)[db] = 10\log_{10}\left(\frac{P(i_{fin},k)[Watt]}{P(i_{init},k)[Watt]}\right) \quad (7)$$

If the samples are linear, the difference in power represents an actual increase in power as expressed by Equation (8):

$$P(i_{fin},k)[Watt]-P(i_{init},k)[Watt]=\Delta P[Watt] \quad (8)$$

In both cases, a positive trend indicates increasing power.

The power trend change is established at step 518. A power trend change may refer to the difference between the trend of a preceding window and the trend of a current window. Power trend change ΔT(k) for window k may be calculated by subtracting preceding power trend trend(k−1) from current power trend trend(k) according to Equation (9):

$$\Delta T(k)=\text{trend}(k)-\text{trend}(k-1) \quad (9)$$

The magnitude, or absolute value, of a power trend change ΔT(k) may exceed a trend change threshold at step 522. A trend change threshold may refer to a configurable threshold above which a power trend change may be seen as sufficiently large to determine a phase adjustment independent of power information. A trend change threshold may have any suitable value, and the value may be expressed in the same units as the calculated power trend change ΔT(k). According to one embodiment, if ΔT(k) has values in a range of ±60 units, the threshold may be set at 10 units. According to one embodiment, the threshold may be set at 10. According to one embodiment, the trend change threshold may be set to zero, which is equivalent to using only the power trend change ΔT(k).

If the magnitude of power trend change ΔT(k) exceeds the trend change threshold at step 522, the method proceeds to step 530. The phase increment is calculated according to the trend change independent of power information at step 530. The phase increment ΔΦ(k) of window k may be calculated according to Equation (10):

$$\Delta\Phi(k)=-\text{sign}[\Delta T(k)]\cdot\text{sign}[\Phi(k)-\Phi(k-1)]\cdot\text{step}_1 \quad (10)$$

where sign(x) represents the sign (+1 or −1) of value x, and $\text{step}_1$ designates a configurable step parameter. A step parameter may refer to a configurable parameter used to control a magnitude of a phase adjustment. The parameter may have any suitable range, for example, between approximately 6 to 90°, and may have values such as 6, 12, 18, . . . , 90°. According to one embodiment, the value may be set at 24°.

According to one embodiment, phases may be expressed as modulo 360. The value and sign of the phase difference $\Delta\Phi(A,B)$ between phases $\Phi_A$ and $\Phi_B$ may be calculated according to Equations (11a)-(11c):

$$\Delta\Phi(A,B)=(\Phi_A-\Phi_B+180)\mod 360-180 \tag{11a}$$

$$\text{sign}(\Delta\Phi(A,B))=\text{sign}((\Phi_A-\Phi_B+180)\mod 360-180) \tag{11b}$$

$$\text{sign}(\Delta\Phi(A,B))=-\text{sign}((\Phi_A-\Phi_B)\mod 360-180) \tag{11c}$$

TABLE 2 provides example calculations.

TABLE 2

| $\Phi_B$ | $\Phi_A$ | $\Phi_A - \Phi_B$ | $(\Phi_A - \Phi_B)$ mod360 | Difference | Sign | Comment |
|---|---|---|---|---|---|---|
| 30 | 50 | 20 | 20 | 20 | + | Phase went up 20° |
| 350 | 10 | −340 | 20 | 20 | + | Phase went up 20° |
| 10 | 350 | 340 | 340 | −20 | − | Phase went down 20° |

The values of TABLE 1 are provided as examples only.

In certain situations, the phase increment may be calculated to be zero. According to Equation (10), phase increment $\Delta\Phi(k)$ is zero if one of the factors of phase increment $\Delta\Phi(k)$ is zero. For example, when sign(x=0) is zero, then phase increment $\Delta\Phi(k)$ is zero. Moreover, subsequent phase increments $\Delta\Phi(k)$ will also be zero. A zero phase increment technique may be applied to the zero phase change situations.

Any suitable technique may be applied. According to a first example technique, sign(0) may be defined to be non-zero, for example, sign(0)=+1. This may, however, create a small bias since zero power differences are treated as positive even though they are neither positive nor negative. According to a second example technique, sign(0) may be assigned alternating signs at each iteration. For example, sign(0) may be assigned first a positive sign, then a negative sign, then a positive sign, and so on. According to a third example technique, sign(0) may be randomly assigned signs at each iteration. For example, at each iteration, and random number may be generated around zero, and the sign of the random number may be assigned to sign(0). According to a fourth example technique, sign(0) is allowed to be equal to zero, but sign($\Delta\Phi$) maintains a non-zero value from a previous iteration. Accordingly, the zero phase increment situation is not repeated.

If the magnitude of power trend change $\Delta T(k)$ does not exceed the trend change threshold at step 522, the method proceeds to step 532. The window power value representing the power of a window is estimated at step 532. The power of a window may refer to the average of power values of participating slots of the window. Window power value power(k) of a window k may be calculated by summing the power values of the participating slots according to Equation (12):

$$\text{power}(k) = \sum_{i=i_{init}}^{i_{fin}} PS(i,k) \tag{12}$$

where $i_{init}$ represents the initial participating slot and $i_{fin}$ represents the final participating slot. Power value PS(i,k) may represent a linear value or a logarithmic value.

The change in power is calculated at step 534. A power change may refer to the difference between the power of a preceding window and the power of a current window. Power change $\Delta P(k)$ for window k may be calculated by subtracting preceding power power(k−1) from current power power (k) according to Equation (13):

$$\Delta P(k)=\text{power}(k)-\text{power}(k-1) \tag{13}$$

Power change $\Delta P(k)$ may be calculated from a power value PS(i,k) representing a linear value or a logarithmic value.

The magnitude of a power change may exceed a power change threshold at step 544. The power change threshold may refer to a configurable threshold that may be used to designate a step parameter for the phase increment calculation. According to one embodiment, a larger step parameter may be used if the power change exceeds the power change threshold, and a smaller step parameter may be used if the power change that does not exceed the power change threshold. The power change threshold may have any suitable value, and the value may be expressed in the same units as the calculated power change $\Delta P(k)$. For example, if $\Delta P(k)$ has values in a range of ±240 units, the threshold may be set at 16 units. According to one embodiment, the power change threshold may be set to a very high value that is practically never exceeded, which is equivalent to using only the power change $\Delta P(k)$. According to another embodiment, the power change threshold may be set to −1 so it is practically always exceeded, which is equivalent to using only the power trend change $\Delta T(k)$ If the magnitude of the power change exceeds the power change threshold at step 544, the method proceeds to step 548. The phase increment is calculated according to the power change using a larger step parameter at step 548. Phase increment $\Delta\Phi(k)$ of window k may be calculated according to Equation (14):

$$\Delta\Phi(k)=-\text{sign}[\Delta P(k)]\cdot\text{sign}[\Phi(k)-\Phi(k-1)]\cdot\text{step}_2 \tag{14}$$

where $\text{step}_2$ designates a configurable step parameter. According to one embodiment $\text{step}_2$ may be substantially similar to that of $\text{step}_1$.

If the magnitude of the power change does not exceed the power change threshold at step 544, the method proceeds to step 552. The phase increment is calculated according to the power change using a smaller step parameter at step 552. Phase increment $\Delta\Phi(k)$ of window k may be calculated according to Equation (15):

$$\Delta\Phi(k)=-\text{sign}[\Delta P(k)]\cdot\text{sign}[\Phi(k)-\Phi(k-1)]\cdot\text{step}_3 \tag{15}$$

where $\text{step}_3$ designates a configurable step parameter. According to one embodiment $\text{step}_2$ may be approximately one-half of $\text{step}_1$.

A next phase adjustment is determined according to the phase increment at step 556. According to one embodiment, a next phase $\Phi(k+1)$ may be calculated from current phase $\Phi(k)$ and phase increment $\Delta\Phi(k)$ according to Equation (1):

$$\Phi(k+1)=\Phi(k)+\Delta\Phi(k) \tag{1}$$

After determining the next phase, the method terminates.

Modifications, additions, or omissions may be made to the method without departing from the scope of the invention. The method may include more, fewer, or other steps. Additionally, steps may be performed in any suitable order without departing from the scope of the invention.

As a first example alternative embodiment, steps 518, 522, and 530 may be modified. According to the embodiment, the power trend values of the windows instead of the power trend changes may be used to determine the modification. To determine the modification, the range of possible trend values may be divided into sub-ranges, and a trend threshold may be specified for each sub-range. For example, a trend threshold vector TTH may be defined according to Equation (16):

$$TTH=(TTH_1, TTH_2, \ldots, TTH_N)=\{TTH_i\}, i=1, 2, \ldots, N \quad (16)$$

where $TTH_i$ represents the trend threshold for sub-range i. According to the embodiment, $TTH_0=-\infty$.

A modification may be calculated according to the power trend values. According to the embodiment, a change in transmit diversity parameter may be expressed by Equation (17):

$$D_n(i,j)=(\Delta A_n, \Delta \Phi_n)(i,j)=(\Delta A_n, \Delta \Phi_n) \text{ for } TTH_{i-1} \leq T_{n-1} < TTH_i \text{ and } TTH_{j-1} \leq T_n < TTH_j, i,j=1, 2, \ldots, N \quad (17)$$

The calculation may be performed using an example lookup table such as TABLE 3.

TABLE 3

| i\j | 1 | 2 | 3 | 4 | 5 | ... | ... | N |
|---|---|---|---|---|---|---|---|---|
| 1 | D(1,1) | D(1,2) | D(1,3) | D(1,4) | D(1,5) | ... | ... | D(1,N) |
| 2 | D(2,1) | D(2,2) | D(2,3) | D(2,4) | D(2,5) | ... | ... | D(2,N) |
| 3 | D(3,1) | D(3,2) | D(3,3) | D(3,4) | D(3,5) | ... | ... | D(3,N) |
| 4 | D(4,1) | D(4,2) | D(4,3) | D(4,4) | D(4,5) | ... | ... | D(4,N) |
| 5 | D(5,1) | D(5,2) | D(5,3) | D(5,4) | D(5,5) | ... | ... | D(5,N) |
| ... | ... | ... | ... | ... | ... | ... | ... | ... |
| ... | ... | ... | ... | ... | ... | ... | ... | ... |
| N | D(N,1) | D(N,2) | D(N,3) | D(N,4) | D(N,5) | ... | ... | D(N,N) |

As a second example embodiment, steps 534, 544, 548, and 552 may be modified. According to the embodiment, the power values of the windows instead of the power change may be used to determine the modification. To determine the modification, the range of possible power values may be divided into sub-ranges, and a power threshold may be specified for each sub-range. For example, a power threshold vector PTH may be defined according to Equation (18):

$$PTH=(PTH_1, PTH_2, \ldots, PTH_N)=\{PTH_i\}, i=1, 2, \ldots, N \quad (18)$$

where $PTH_i$ represents the power threshold for sub-range i. According to the embodiment, $PTH_0=-\infty$.

A modification may be calculated according to the power values. According to the embodiment, a change in transmit diversity parameter may be expressed by Equation (19):

$$D_n(i,j)=(\Delta A_n, \Delta \Phi_n)(i,j)=(\Delta A_n, \Delta \Phi_n) \text{ for } PTH_{i-1} \leq P_{n-1} < PTH_i \text{ and } PTH_{j-1} \leq P_n < PTH_j, i,j=1, 2, \ldots, N \quad (19)$$

The calculation may be performed using an example lookup table such as TABLE 3.

As a third example embodiment, steps 522, 530, 544, 548, and 552 may be modified. According to the embodiment, a modification may be determined based on power trend change $\Delta T(k)$ and power change $\Delta P(k)$. The range of possible trend values may be divided into sub-ranges, and a trend threshold and logic may be designated for each sub-range. A trend threshold vector TTH may be defined according to Equation (16). The range of possible power values may be divided into sub-ranges, and a power threshold may be designated for each sub-range. A power threshold vector PTH may be defined according to Equation (18). In addition, power-trend tables PT may be defined for each combination of a power sub-range and a trend sub-range.

Based on power trend and power values estimated at steps 518 and 532, a specific table PT(i0,j0) may be selected according to Equation (20):

$$\text{if } TTH_{i0-1} \leq T_k < TTH_{i0} \text{ and } PTH_{j0-1} \leq P_k < PTH_{j0}, \text{ then } i=i0 \text{ and } j=j0 \quad (20)$$

Diversity parameter increments $D_k(i1,j1)=(\Delta A_k, \Delta \Phi_k)(i1,j1)$ may be determined from a table PT(i1,j1). Entry (i1,j1) of table PT(i1,j1) may be determined by next threshold values for the difference in trend $DTTH_i$ and threshold values for the difference in power $DPTH_i$ according to Equation (21):

$$\text{if } DTTH_{i1-1} \leq \Delta T(k) < DTTH_{i1} \text{ and } DPTH_{j0-1} \leq \Delta P(k) < DPTH_{j0}, \text{ then } i=i1, j=j1 \quad (21)$$

As a fourth example embodiment, steps 514 and 532 may be modified.

According to the embodiment, values for either power P(k−1) or trend T(k−1) or both may be modified by using the power samples that were not available when diversity parameter increment D(k−1) was calculated. As discussed above, one or more power samples corresponding to the diversity parameters of window k may become available during the time corresponding to window (k+1). By the time diversity parameter increment D(k−1) is determined, the missing power samples of window (k−1) may be available and may be used to modify the power P(k−1) and trend T(k−1) values.

According to the embodiment, weighted values of the missing samples may be used to modify the calculated values according to Equations (22) and (23):

$$P(k-1)=(q/p)*P_p(k-1) \quad (22)$$

$$T(k-1)=(q/p)*T_p(k-1) \quad (23)$$

where p represents the samples used in window (k−1), and q represents the samples used in window k.

Certain embodiments of the invention may provide one or more technical advantages. A technical advantage of one embodiment may be that a signal may be modified to optimize signal power. The signal may be modified in accordance with phase adjustments calculated from power trend changes. Power trend changes may yield more accurate estimates of the phase adjustments that optimize signal power. A technical advantage of another embodiment may be that power trend changes may be determined from a control signal that is divided into windows. Each window may include participating slots that provide information about the power trend of a window. The power trend of a preceding window may be compared to the power trend of a current window in order to determine a power trend change.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for calculating a phase adjustment, comprising:
    establishing a current phase adjustment for a signal transmitted from a modifying communication device to a feedback communication device;
    receiving a control signal comprising a plurality of windows, a window communicating one or more power indicators, a power indicator reflecting the power of the signal as received by the feedback communication device, the plurality of windows comprising:
one or more previous windows, a previous window communicating one or more previous power indicators reflecting the power of the signal adjusted according to a previous phase adjustment; and
a current window communicating one or more current power indicators reflecting the power of the signal adjusted according to the current phase adjustment;
estimating a previous power trend from the one or more previous power indicators;
estimating a current power trend from the one or more current power indicators;
determining a power trend change from the previous power trend and the current power trend, the power trend change representing a change between the previous power trend and the current power trend;
determining a phase increment in accordance with the power trend change; and
calculating a next phase adjustment from the current phase adjustment and the phase increment.

2. The method of claim 1, wherein:
the current window comprises a plurality of participating slots; and
estimating the current power trend from the one or more current power indicators further comprises:
establishing an initial slot power value from an initial power indicator of an initial participating slot;
establishing a final slot power value from a final power indicator of a final participating slot; and
determining a difference between the initial slot power value and the final slot power value to estimate the current power trend.

3. The method of claim 1, wherein determining the phase increment in accordance with the power trend change further comprises:
establishing if the power trend change is greater than a power trend change threshold;
determining the phase increment using a power change if the power trend change is less than the power trend change threshold, the power change representing the difference between a current window power value of the current window and a previous window power value of the previous window; and
determining the phase increment independent of the power change if the power trend change is greater than the power trend change threshold.

4. The method of claim 1, wherein determining the phase increment in accordance with the power trend change further comprises:
establishing that the power trend change is greater than a power trend change threshold; and
determining the phase increment from the power trend change.

5. The method of claim 1, wherein determining the phase increment in accordance with the power trend change further comprises:
establishing that the power trend change is less than a power trend change threshold;
calculating a power change, the power change representing the difference between a current window power value of the current window and a previous window power value of the previous window; and
determining the phase increment in accordance with the power change.

6. The method of claim 5, wherein determining the phase increment in accordance with the power change further comprises:
establishing whether the power change is greater than a power change threshold;
calculating the phase increment according to a larger step parameter if the power change is greater than the power change threshold, a step parameter used to control a magnitude of a phase adjustment; and
calculating the phase increment using a smaller step parameter if the power change is less than the power change threshold, the smaller step parameter less than the larger step parameter.

7. The method of claim 1, wherein determining the phase increment in accordance with the power trend change further comprises:
encountering a zero phase change situation; and applying a zero phase increment technique to the zero phase change situation.

8. The method of claim 1, wherein determining the phase increment in accordance with the power trend change further comprises:
determining the phase increment using one of the power trend change and the power change.

9. A system for calculating a phase adjustment, comprising:
an interface operable to receive and send a plurality of signals, the plurality of signals to be transmitted from a modifying communication device to a feedback communication device; and
control logic circuitry coupled to the interface and operable to:
establish a current phase adjustment for a signal transmitted from the modifying communication device to the feedback communication device;
receive a control signal comprising a plurality of windows, a window communicating one or more power indicators, a power indicator reflecting the power of the signal as received by the feedback communication device, the plurality of windows comprising:
one or more previous windows, a previous window communicating one or more previous power indicators reflecting the power of the signal adjusted according to a previous phase adjustment; and
a current window communicating one or more current power indicators reflecting the power of the signal adjusted according to the current phase adjustment;
estimate a previous power trend from the one or more previous power indicators;
estimate a current power trend from the one or more current power indicators;
determine a power trend change from the previous power trend and the current power trend, the power trend change representing a change between the previous power trend and the current power trend;
determine a phase increment in accordance with the power trend change; and
calculate a next phase adjustment from the current phase adjustment and the phase increment.

10. The system of claim 9, wherein:
the current window comprises a plurality of participating slots; and
the control logic is further operable to estimate the current power trend from the one or more current power indicators by:
establishing an initial slot power value from an initial power indicator of an initial participating slot;

establishing a final slot power value from a final power indicator of a final participating slot; and determining a difference between the initial slot power value and the final slot power value to estimate the current power trend.

11. The system of claim 9, the control logic further operable to determine the phase increment in accordance with the power trend change by:

establishing if the power trend change is greater than a power trend change threshold;

determining the phase increment using a power change if the power trend change is less than the power trend change threshold, the power change representing the difference between a current window power value of the current window and a previous window power value of the previous window; and determining the phase increment independent of the power change if the power trend change is greater than the power trend change threshold.

12. The system of claim 9, the control logic further operable to determine the phase increment in accordance with the power trend change by:

establishing that the power trend change is greater than a power trend change threshold; and determining the phase increment from the power trend change.

13. The system of claim 9, the control logic further operable to determine the phase increment in accordance with the power trend change by:

establishing that the power trend change is less than a power trend change threshold;

calculating a power change, the power change representing the difference between a current window power value of the current window and a previous window power value of the previous window; and determining the phase increment in accordance with the power change.

14. The system of claim 13, the control logic further operable to determine the phase increment in accordance with the power change by:

establishing whether the power change is greater than a power change threshold;

calculating the phase increment according to a larger step parameter if the power change is greater than the power change threshold, a step parameter used to control a magnitude of a phase adjustment; and calculating the phase increment using a smaller step parameter if the power change is less than the power change threshold, the smaller step parameter less than the larger step parameter.

15. The system of claim 9, the control logic further operable to determine the phase increment in accordance with the power trend change by:

encountering a zero phase change situation; and applying a zero phase increment technique to the zero phase change situation.

16. The system of claim 9, the control logic further operable to determine the phase increment in accordance with the power trend change by:

determining the phase increment using one of the power trend change and the power change.

17. A computer-readable medium embodying logic circuitry for calculating a phase adjustment, the logic operable to:

establish a current phase adjustment for a signal transmitted from a modifying communication device to a feedback communication device;

receive a control signal comprising a plurality of windows, a window communicating one or more power indicators, a power indicator reflecting the power of the signal as received by the feedback communication device, the plurality of windows comprising:

one or more previous windows, a previous window communicating one or more previous power indicators reflecting the power of the signal adjusted according to a previous phase adjustment; and a current window communicating one or more current power indicators reflecting the power of the signal adjusted according to the current phase adjustment;

estimate a previous power trend from the one or more previous power indicators;

estimate a current power trend from the one or more current power indicators;

determine a power trend change from the previous power trend and the current power trend, the power trend change representing a change between the previous power trend and the current power trend;

determine a phase increment in accordance with the power trend change; and calculate a next phase adjustment from the current phase adjustment and the phase increment.

18. The computer-readable medium of claim 17, wherein:

the current window comprises a plurality of participating slots; and the logic is further operable to estimate the current power trend from the one or more current power indicators by:

establishing an initial slot power value from an initial power indicator of an initial participating slot;

establishing a final slot power value from a final power indicator of a final participating slot; and determining a difference between the initial slot power value and the final slot power value to estimate the current power trend.

19. The computer-readable medium of claim 17, wherein said logic is further operable to determine the phase increment in accordance with the power trend change by:

establishing if the power trend change is greater than a power trend change threshold;

determining the phase increment using a power change if the power trend change is less than the power trend change threshold, the power change representing the difference between a current window power value of the current window and a previous window power value of the previous window; and determining the phase increment independent of the power change if the power trend change is greater than the power trend change threshold.

20. The computer-readable medium of claim 17, wherein said logic is further operable to determine the phase increment in accordance with the power trend change by:

establishing that the power trend change is greater than a power trend change threshold; and determining the phase increment from the power trend change.

21. The computer-readable medium of claim 17, wherein said logic is further operable to determine the phase increment in accordance with the power trend change by:

establishing that the power trend change is less than a power trend change threshold;

calculating a power change, the power change representing the difference between a current window power value of the current window and a previous window power value of the previous window; and determining the phase increment in accordance with the power change.

22. The computer-readable medium of claim 21, wherein said logic is further operable to determine the phase increment in accordance with the power change by:
    establishing whether the power change is greater than a power change threshold;
    calculating the phase increment according to a larger step parameter if the power change is greater than the power change threshold, a step parameter used to control a magnitude of a phase adjustment; and
    calculating the phase increment using a smaller step parameter if the power change is less than the power change threshold, the smaller step parameter less than the larger step parameter.

23. The computer-readable medium of claim 17, wherein said logic is further operable to determine the phase increment in accordance with the power trend change by:
    encountering a zero phase change situation; and
    applying a zero phase increment technique to the zero phase change situation.

24. The computer-readable medium of claim 17, wherein said logic is further operable to determine the phase increment in accordance with the power trend change by:
    determining the phase increment using one of the power trend change and the power change.

25. A system for calculating a phase adjustment, comprising:
    means for establishing a current phase adjustment for a signal transmitted from a modifying communication device to a feedback communication device;
    means for receiving a control signal comprising a plurality of windows, a window communicating one or more power indicators, a power indicator reflecting the power of the signal as received by the feedback communication device, the plurality of windows comprising:
        one or more previous windows, a previous window communicating one or more previous power indicators reflecting the power of the signal adjusted according to a previous phase adjustment; and
        a current window communicating one or more current power indicators reflecting the power of the signal adjusted according to the current phase adjustment;
    means for estimating a previous power trend from the one or more previous power indicators;
    means for estimating a current power trend from the one or more current power indicators;
    means for determining a power trend change from the previous power trend and the current power trend, the power trend change representing a change between the previous power trend and the current power trend;
    means for determining a phase increment in accordance with the power trend change; and
    means for calculating a next phase adjustment from the current phase adjustment and the phase increment.

26. A method for calculating a phase adjustment, comprising:
    establishing a current phase adjustment for a signal transmitted from a modifying communication device to a feedback communication device;
    receiving a control signal comprising a plurality of windows, a window communicating one or more power indicators, a power indicator reflecting the power of the signal as received by the feedback communication device, the plurality of windows comprising:
        one or more previous windows, a previous window communicating one or more previous power indicators reflecting the power of the signal adjusted according to a previous phase adjustment; and
        a current window communicating one or more current power indicators reflecting the power of the signal adjusted according to the current phase adjustment;
    estimating a previous power trend from the one or more previous power indicators;
    estimating a current power trend from the one or more current power indicators, the current window comprising a plurality of participating slots, the current power trend estimated by:
        establishing an initial slot power value from an initial power indicator of an initial participating slot;
        establishing a final slot power value from a final power indicator of a final participating slot; and
        determining a difference between the initial slot power value and the final slot power value to estimate the current power trend;
    determining a power trend change from the previous power trend and the current power trend, the power trend change representing a change between the previous power trend and the current power trend;
    determining a phase increment in accordance with the power trend change by:
        establishing if the power trend change is greater than a power trend change threshold;
        determining the phase increment using a power change if the power trend change is less than the power trend change threshold, the power change representing the difference between a current window power value of the current window and a previous window power value of the previous window, the phase increment determined using the power change by:
        calculating the power change; and
        determining the phase increment in accordance with the power change by:
            establishing whether the power change is greater than a power change threshold;
            calculating the phase increment according to a larger step parameter if the power change is greater than the power change threshold, a step parameter used to control a magnitude of a phase adjustment; and
            calculating the phase increment using a smaller step parameter if the power change is less than the power change threshold, the smaller step parameter less than the larger step parameter; and
        determining the phase increment from the power trend change and independent of the power change if the power trend change is greater than the power trend change threshold;
        encountering a zero phase change situation; applying a zero phase increment technique to the zero phase change situation;
        determining the phase increment using one of the power trend change and the power change; and
    calculating a next phase adjustment from the current phase adjustment and the phase increment.

27. A method for calculating a phase adjustment, comprising:
    establishing a current phase adjustment for a signal transmitted from a modifying communication device to a feedback communication device;

receiving a plurality of power indicators, a power indicator reflecting the power of the signal as received by the feedback communication device, the plurality of power indicators comprising:
  one or more previous power indicators reflecting the power of the signal adjusted according to a previous phase adjustment; and
  one or more current power indicators reflecting the power of the signal adjusted according to the current phase adjustment; estimating a previous power descriptor value from the one or more previous power indicators;
estimating a current power descriptor value from the one or more current power indicators;
determining a phase increment in accordance with the previous power descriptor value and the current power descriptor value; and
calculating a next phase adjustment from the current phase adjustment and the phase increment.

28. The method of claim 27, wherein receiving the plurality of power indicators further comprises:
receiving a control signal comprising a plurality of windows comprising:
  one or more previous windows, a previous window communicating the one or more previous power indicators; and
  a current window communicating the one or more current power indicators.

29. The method of claim 27, wherein:
The previous power descriptor value comprises a previous power trend value; and
the current power descriptor value comprises a current power trend value.

30. The method of claim 27, wherein:
the previous power descriptor value comprises a previous power value; and
the current power descriptor value comprises a current power value.

31. The method of claim 27, wherein estimating the current power descriptor value from the one or more current power indicators further comprises:
receiving a late power indicator;
weighting the late power indicator to yield a weighted late power indicator; and
estimating the current power descriptor value using the one or more current power indicators and the weighted power indicator.

32. The method of claim 27, wherein determining the phase increment in accordance with the previous power descriptor value and the current power descriptor value further comprises:
accessing a lookup table comprising a plurality of entries, an entry associating a possible previous power descriptor value and a possible current power descriptor value with a modification;
identifying an entry corresponding to the previous power descriptor value and the current power descriptor value; and
determining the phase increment in accordance with the modification of the identified entry.

33. A system for calculating a phase adjustment, comprising:
an interface operable to receive and send a plurality of signals, the plurality of signals to be transmitted from a modifying communication device to a feedback communication device; and
control logic circuitry coupled to the interface and operable to:
  establish a current phase adjustment for a signal transmitted from the modifying communication device to the feedback communication device;
  receive a plurality of power indicators, a power indicator reflecting the power of the signal as received by the feedback communication device, the plurality of power indicators comprising:
    one or more previous power indicators reflecting the power of the signal adjusted according to a previous phase adjustment; and
    one or more current power indicators reflecting the power of the signal adjusted according to the current phase adjustment;
  estimate a previous power descriptor value from the one or more previous power indicators;
  estimate a current power descriptor value from the one or more current power indicators;
  determine a phase increment in accordance with the previous power descriptor value and the current power descriptor value; and
  calculate a next phase adjustment from the current phase adjustment and the phase increment.

34. The system of claim 33, the control logic further operable to receive the plurality of power indicators by:
receiving a control signal comprising a plurality of windows comprising:
  one or more previous windows, a previous window communicating the one or more previous power indicators; and
  a current window communicating the one or more current power indicators.

35. The system of claim 33, wherein:
the previous power descriptor value comprises a previous power trend value; and
the current power descriptor value comprises a current power trend value.

36. The system of claim 33, wherein:
the previous power descriptor value comprises a previous power value; and
the current power descriptor value comprises a current power value.

37. The system of claim 33, the control logic further operable to estimate the current power descriptor value from the one or more current power indicators by:
receiving a late power indicator;
weighting the late power indicator to yield a weighted late power indicator; and
estimating the current power descriptor value using the one or more current power indicators and the weighted power indicator.

38. The system of claim 33, the control logic further operable to determine the phase increment in accordance with the previous power descriptor value and the current power descriptor value by:
accessing a lookup table comprising a plurality of entries, an entry associating a possible previous power descriptor value and a possible current power descriptor value with a modification;
identifying an entry corresponding to the previous power descriptor value and the current power descriptor value; and
determining the phase increment in accordance with the modification of the identified entry.

39. The system of claim 33, wherein:
the previous power descriptor value comprises a previous power trend value;
the current power descriptor value comprises a current power trend value;
the previous power descriptor value comprises a previous power value;
the current power descriptor value comprises a current power value; and
the control logic is further operable to:
receive the plurality of power indicators by:
receiving a control signal comprising a plurality of windows comprising:
one or more previous windows, a previous window communicating the one or more previous power indicators; and
a current window communicating the one or more current power indicators;
estimate the current power descriptor value from the one or more current power indicators by:
receiving a late power indicator;
weighting the late power indicator to yield a weighted late power indicator; and
estimating the current power descriptor value using the one or more current power indicators and the weighted power indicator; and
determine the phase increment in accordance with the previous power descriptor value and the current power descriptor value by:
accessing a lookup table comprising a plurality of entries, an entry associating a possible previous power descriptor value and a possible current power descriptor value with a modification;
identifying an entry corresponding to the previous power descriptor value and the current power descriptor value; and
determining the phase increment in accordance with the modification of the identified entry.

40. A computer-readable medium embodying logic circuitry for calculating a phase adjustment, the logic operable to:
establish a current phase adjustment for a signal transmitted from a modifying communication device to a feedback communication device;
receive a plurality of power indicators, a power indicator reflecting the power of the signal as received by the feedback communication device, the plurality of power indicators comprising:
one or more previous power indicators reflecting the power of the signal adjusted according to a previous phase adjustment; and
one or more current power indicators reflecting the power of the signal adjusted according to the current phase adjustment;
estimate a previous power descriptor value from the one or more previous power indicators;
estimate a current power descriptor value from the one or more current power indicators;
determine a phase increment in accordance with the previous power descriptor value and the current power descriptor value; and
calculate a next phase adjustment from the current phase adjustment and the phase increment.

41. The computer-readable medium of claim 40, wherein said logic is further operable to receive the plurality of power indicators by:
receiving a control signal comprising a plurality of windows comprising:
one or more previous windows, a previous window communicating the one or more previous power indicators; and
a current window communicating the one or more current power indicators.

42. The computer-readable medium of claim 40, wherein:
the previous power descriptor value comprises a previous power trend value; and
the current power descriptor value comprises a current power trend value.

43. The computer-readable medium of claim 40, wherein:
the previous power descriptor value comprises a previous power value; and
the current power descriptor value comprises a current power value.

44. The computer-readable medium of claim 40, wherein said logic is further operable to estimate the current power descriptor value from the one or more current power indicators by:
receiving a late power indicator; weighting the late power indicator to yield a weighted late power indicator; and
estimating the current power descriptor value using the one or more current power indicators and the weighted power indicator.

45. The computer-readable medium of claim 40, wherein determining the phase increment in accordance with the previous power descriptor value and the current power descriptor value further comprises:
accessing a lookup table comprising a plurality of entries, an entry associating a possible previous power descriptor value and a possible current power descriptor value with a modification;
identifying an entry corresponding to the previous power descriptor value and the current power descriptor value; and
determining the phase increment in accordance with the modification of the identified entry.

* * * * *